United States Patent
Parise

[11] Patent Number: 6,024,867
[45] Date of Patent: Feb. 15, 2000

[54] COUNTER TOP WATER FILTER WITH REPLACEABLE ELECTRONIC DISPLAY MONITOR

[75] Inventor: Michael C. Parise, Sparks, Nev.

[73] Assignee: Water Safety Corp. of America, Sparks, Nev.

[21] Appl. No.: 08/854,621

[22] Filed: May 12, 1997

Related U.S. Application Data

[63] Continuation-in-part of application No. 08/364,685, Dec. 28, 1994, Pat. No. 5,656,160.

[51] Int. Cl.$^7$ .................................................... B01D 35/00
[52] U.S. Cl. .......................... 210/87; 210/232; 210/244; 210/282; 210/416.3; 210/441; 210/446
[58] Field of Search ............................. 210/87, 232, 244, 210/282, 315, 316, 416.3, 437, 441, 446

[56] References Cited

U.S. PATENT DOCUMENTS

| | | |
|---|---|---|
| 3,342,340 | 9/1967 | Shindell . |
| 4,218,317 | 8/1980 | Kirschmann . |
| 5,032,268 | 7/1991 | Hahn . |
| 5,089,144 | 2/1992 | Ozkahyaoglu et al. ............... 210/87 |
| 5,108,599 | 4/1992 | Lowery ................................ 210/282 |
| 5,252,206 | 10/1993 | Gonzalez . |
| 5,308,483 | 5/1994 | Sklar et al. . |
| 5,328,597 | 7/1994 | Boldt, Jr. et al. .................... 210/87 |
| 5,510,031 | 4/1996 | Knauf, Jr. et al. .................. 210/460 |
| 5,656,160 | 8/1997 | Parise et al. ........................ 210/232 |
| 5,676,824 | 10/1997 | Jeon et al. .......................... 210/87 |

Primary Examiner—Jay H. Woo
Assistant Examiner—Betsey J. Morrison
Attorney, Agent, or Firm—James M. Ritchey

[57] ABSTRACT

A counter top water filter unit intended for domestic use to be placed adjacent to a sink and having an inlet at its lower end which is coupled to the sink faucet. The filter unit includes a cylindrical-shaped carbon particle filter cartridge which has a longitudinal passage extending from one end to the other, and a removable pre-filter screen coaxial with the cartridge and surrounding the cartridge, both elements being removably mounted within a cylindrical filter housing, the housing being closed at its upper end and open at its lower end. A replaceable electronic display monitor unit is mounted in an outlet housing fitted to the top of the cylindrical filter housing. The state of the life-span of the filter cartridge is shown on the display monitor in terms of colored indicator lights which denote whether the filter cartridge is within, nearing an end to, and outside its expected life-span.

12 Claims, 7 Drawing Sheets

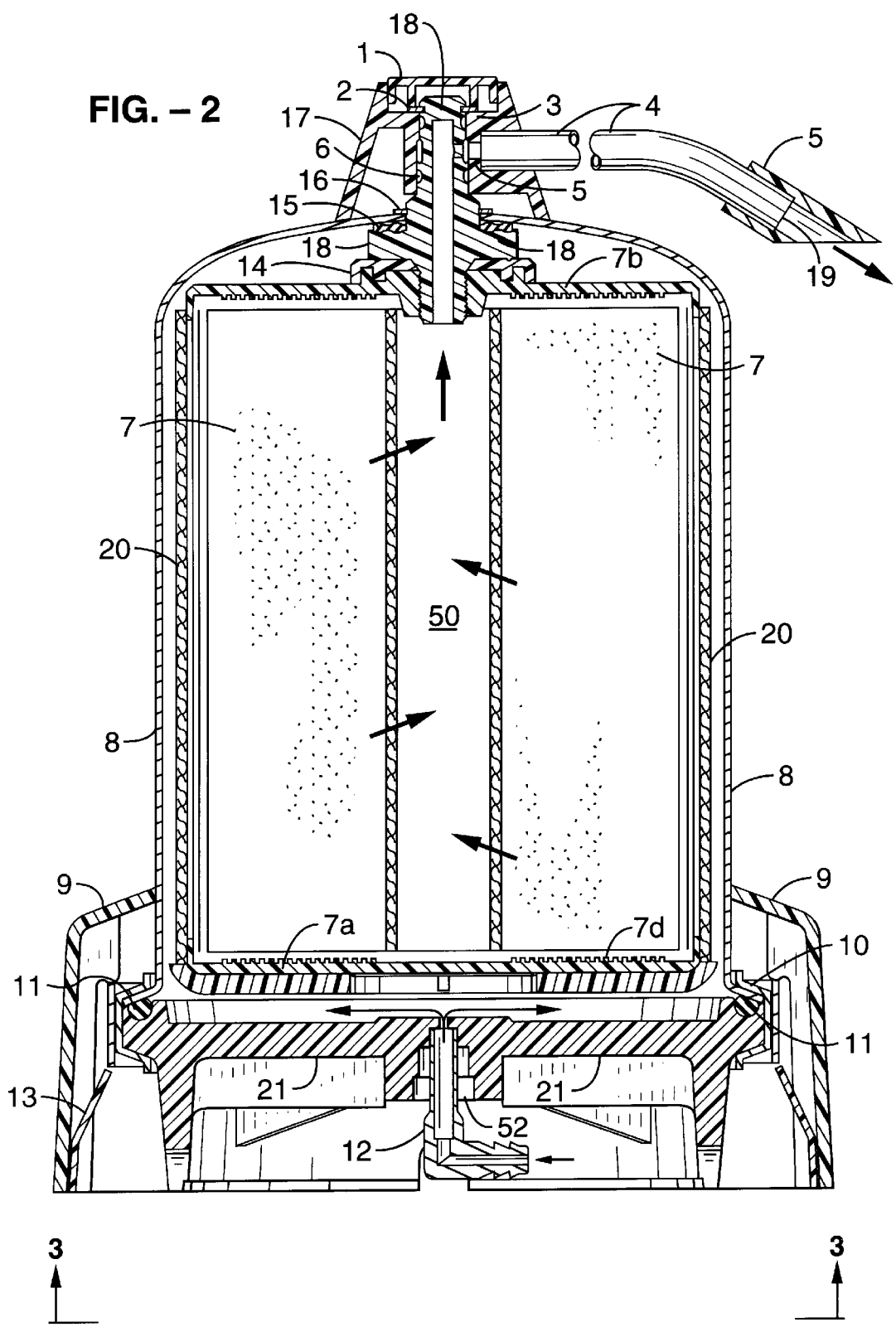

COUNTER TOP WATER FILTER WITH REPLACEABLE ELECTRONIC DISPLAY MONITOR

CROSS-REFERENCE TO RELATED APPLICATIONS

This is a continuation continuation-in-part of application Ser. No. 08/364,685 filed on Dec. 28, 1994 and now U.S. Pat. No. 5,656,160.

BACKGROUND OF THE INVENTION

1. Field of the Invention

A water filtration device is disclosed that includes an electronic display that enables a user to determine readily if a contained filter cartridge is within its useful life-span, nearing the end of its useful life-span, or expired. More particularly, the electronic display of the subject filtration device comprises a set of colored lights in which green indicates the cartridge is within its useful life-span, yellow indicates the cartridge is nearing the end of its useful life-span, and red for an expired cartridge.

2. Description of the Background Art

Various types of water filters have existed for some time, however, none contains the advantages of the subject invention. Specifically, U.S. Pat. No. 5,308,483 discloses a cylindrical microporous filtration funnel assembly. A housing is divided into inlet and outlet chambers by a filter membrane. Materials trapped on the upper surface of the filter may be removed for study by disassembling the apparatus.

Disclosed in U.S. Pat. No. 5,032,268 is a self-contained canister filter unit for filtering tap water. Water enters the housing through a top aperture, passes through the sides of a reverse osmosis membrane into an activated carbon region, and exits the device purified. Salts, minerals, and particulates are removed via a lower end cap on the housing.

U.S. Pat. No. 4,218,317 relates a reverse osmosis water purifier having a flush water restrictor which serves to provide a suitable back pressure on the reverse osmosis membrane in order to affect the purification process. The restrictor device is an appropriately sized capillary tube.

Described in U.S. Pat. No. 3,342,340 is a water conditioner apparatus having a contamination from tap water. Entering water is forced through two sequential chambers. The lower chamber may be filled with ion-exchange resin and the upper chamber with activated carbon.

Lastly, U.S. Pat. No. 5,252,206 presents a filtration cartridge that comprises layered filters. Within the cartridge are a carbon block and a ceramic filter.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

SUMMARY OF THE INVENTION

An object of the present invention is to provide a water filtering device that includes a means for visually following the life-span of the filter cartridge.

Another object of the present invention is to disclose a counter top water filtering device that has a removable electronic display monitor unit that presents a visual indicator as to the life-span of the included filter cartridge.

A further object of the present invention is to relate a cylindrical water filtering system that permits a user to easily change both an inner filter cartridge and an electronic display monitor unit that tracks, via colored lighting displays, the useful life of the inner filter cartridge.

Still another object of the present invention is to present a water filter apparatus that has a removable electronic display monitor unit that contains its own power source that is utilized to follow the life-span of an associated filter cartridge within the water filter apparatus.

Disclosed is a water filter unit which includes a main housing having a removable main filter cartridge, and it is intended primarily for domestic use to filter impurities out of tap water. The unit may be placed on a usual counter adjacent to the sink. The filter unit may conveniently be coupled to a diverter valve which, in turn, is connected to the sink water faucet. The diverter valve may be manually set for normal water flow from the faucet into the sink when it is in a first position, and for water flow through the filter unit of the invention when it is in a second position.

Usually, the filter unit of the invention is coupled to the diverter through an angled elbow which is fitted into the inlet of the filter at its lower end for 360° rotational movement. This permits placement of the filter unit on either the left side or right side of the sink with a minimum length of connecting tubing.

The filter unit of the invention is equipped with a pressure balanced 360° rotatable outlet housing, with an elongated spout being fitted into the outlet housing. The rotatable outlet housing, in turn, is mounted on an elongated fitting which extends into the interior of the filter. The subassembly is constructed to ensure smooth operation of the filter with or without water pressure in the system and to prevent the top of the filter from blowing off in the event of pressure buildup in the spout. The spout is equipped with a sani-tip and screen to provide a smooth, coherent stream of water without splatter.

A spring-loaded retaining ring is provided between the outlet fitting and the rotatable outlet housing to assure that the outlet housing rests firmly against the outer surface of the main housing of the filter unit to provide a smooth, constant friction bearing surface for the outlet housing as the spout is turned about the longitudinal axis of the filter, and to prevent the outlet housing from being pulled off the filter unit when the unit is carried by the top of the outlet subassembly.

Custom-designed sealing washers are provided with sealing ribs to create a leak-proof seal between the filtered and unfiltered water in the sealed filter unit and between the water within the filter unit and the outside world.

Commonly, the filter unit of the invention is equipped with a pre-filter in the form of a removable and washable filter screen which extends around the main filter cartridge and which serves to prevent clogging of the main filter cartridge.

Included as a critical element in the subject invention is an electronic display monitor that permits a user to detect the state of the life-span of the filter cartridge. Preferably, the electronic display monitor comprises the required electronics and associated display for sensing and then displaying the state of the life-span of the filter cartridge via light emitting sources that reflect by color the state of the life-span. To conserve the life of the powering battery, each light source is usually non-continuous or blinks.

In summary, the counter top water filter unit is intended for domestic use to be placed adjacent to a sink and having an inlet at its lower end which is coupled to the sink faucet through a swivelly mounted angled elbow capable of 360° rotation so as to facilitate the coupling of the filter to the faucet from either side. The filter unit includes a cylindrical-shaped carbon particle filter cartridge which has a longitudinal passage extending from one end to the other, and a removable pre-filter screen coaxial with the cartridge and surrounding the cartridge, both elements being removably mounted within a cylindrical filter housing, the housing being closed at its upper end and open at its lower end. The filter cartridge has an upper end cap and a lower end cap, with the upper end cap being spaced down from the closed top of the filter housing when the cartridge is in place. An outlet fitting is mounted between the upper end cap of the cartridge and the closed top of the filter housing, and extends through an opening in the closed top in coaxial relationship with the cartridge. The fitting has an internal passage communicating with the central passage of the cartridge. An outlet housing is rotatably mounted on the protruding end of the fitting and is secured to the fitting. A radially-extending elongated outlet spout is fitting into the outlet housing, and the spout is coupled to the passage which extends through the outlet housing. The spout and outlet housing are rotatable about the longitudinal axis of the filter. Water entering through the inlet is the lower end of the filter passes up into the filter housing and through the annular channel which surrounds the pre-filter screen. The water then passes through the pre-filter screen and through the filter cartridge. The resulting filtered water travels up the central passage of the cartridge and through the passage in the fitting to the outlet spout. Based on the time water flows through the unit, the electronic display monitor presents green for a filter cartridge within its useful life-span, yellow for a filter cartridge about to exit its useful life-span, and red for an expired filter cartridge.

Other objects, advantages, and novel features of the present invention will become apparent from the detailed description that follows, when considered in conjunction with the associated drawings.

BRIEF DESCRIPTION OF THE DRAWINGS

FIG. 2 is a side section of the unit of FIG. 1 taken essentially along lines 2—2 of FIG. I for the subject device without the electronic display monitor.

DESCRIPTION OF THE PREFERRED EMBODIMENT

Figure 1:
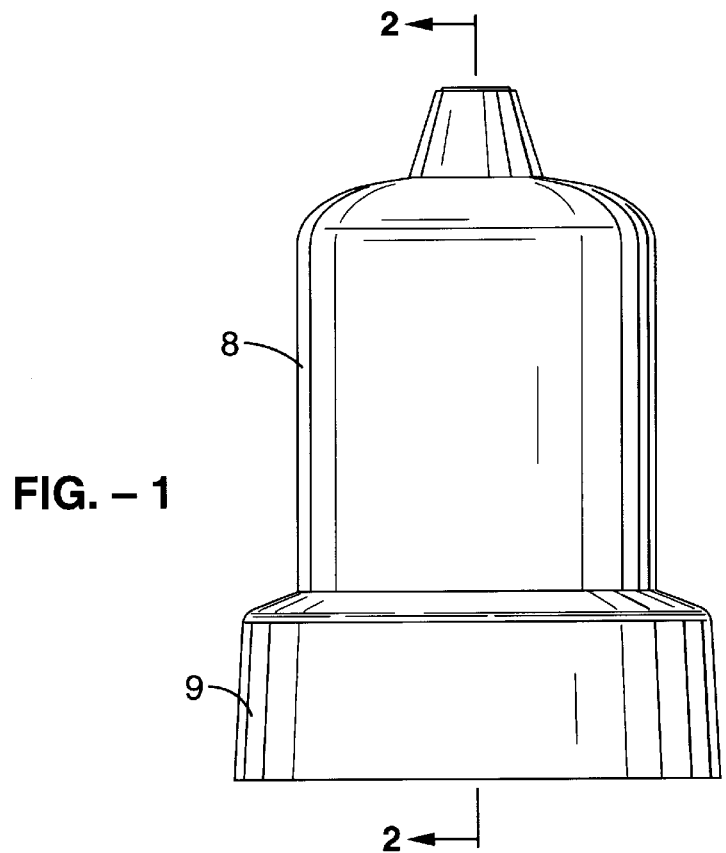
FIG. 1 is a side elevation view of a filter unit without the electronic display monitor which may be constructed to incorporate the concepts of the present invention.
Figure 3:
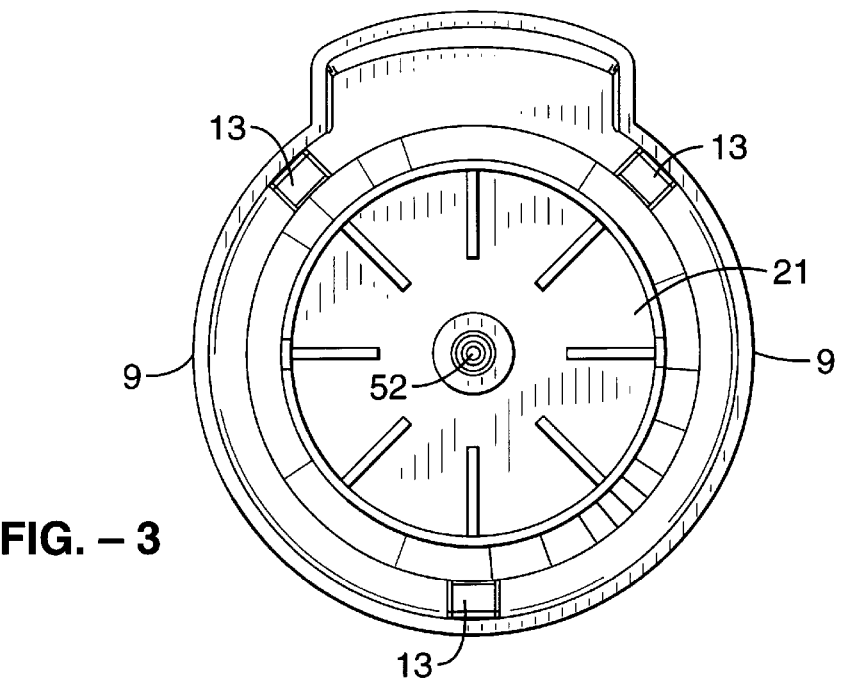
FIG. 3 is a bottom view of the subject device with or without the electronic display monitor taken essentially along the lines 3—3 of FIG. 2.

Two embodiments of the subject invention are described in which the first related embodiment does not include a replaceable electronic display monitor and the second in which the replaceable electronic display monitor is disclosed. The first embodiment of the subject invention is shown in FIGS. 1–3 includes a tubular filter housing 8 which is supported in an upright position on a base 21, with the housing and base being in coaxially relationship. A main cylindrical-shaped filter cartridge 7 is supported within the filter housing 8 in coaxial relationship. The filter cartridge 7 includes a quantity of carbon particles, or other appropriate filtering material. The cartridge 7 is constructed to have a central passage extending from one end of the cartridge to the other.

The filter cartridge 7 includes an upper end cap 7b and a lower end cap 7a. The lower end cap has reinforcing ribs 7d formed thereon to provide radial support for the lower end of cartridge 7. An elongated fitting 18 is mounted on the top of the filter housing 8, and extends through an opening in the top to be interposed in the space between the upper end cap 7b and the undersurface of the top of filter housing 8. Fitting 18 has a passage extending longitudinally therethrough which communicates with the central passage 50 of the main filter cartridge 7. The fitting 18 is sealed to the underside of the top of filter housing 8 by a specially-designed washer 15, and is sealed to the top end cap 7B by a second specially designed washer 14. Washers 14 serve effectively to seal the fitting to the top end cap 7B and to the filter housing 8. The fitting is secured to housing 8 by a retaining ring 16.

An outlet housing 17 is rotatably mounted on the protruding end of the fitting 18, and is effectively sealed with respect to the fitting by 0-rings 3 and 6. The rotatable outlet housing is biased downwardly against the upper surface of the top of the filter housing 8 by a resilient retaining ring 2 which is held in place by a groove in fitting 18. The retaining ring 2 serves to bias the lower edge of the outlet housing 17 against the top surface of the filter housing 8 to provide a smooth bearing surface. The retaining ring provides constant pressure so as to establish a constant friction between the rotatable outlet housing 17 and the main filter housing 8 for smooth operation. A decorative cap 1 is fitted into the top of outlet housing 17.

A spout 45 is fitted into the side of the rotatable outlet fitting 18, as best shown in FIG. 2, and the spout extends radially outwardly from the fitting. The fitting has orifices which couples the central longitudinal passage of the fitting to the interior of the spout, so that filtered water passing upwardly in the central passage of the filter cartridge 7 and through the longitudinal passage in fitting 18 will pass through the spout.

The spout has a sani-tip 5, usually easily removable fitted over its distal end, with the distal end being covered by a usual screen 19 so that a smooth, coherent stream of filtered water is provided without splatter.

The main filter housing 8 is supported on a base 21 at its lower end, with the base being in coaxial relationship with the filter housing. The housing 8 is secured to the base by appropriate removable clamps 10 and sealed to the base by 0-rings 11. An inlet is provided at the center of the base 21, and a 90 degree elbow 12 is fitted into the inlet 52. The elbow is coupled to a diverter valve which, in turn, is coupled to a faucet, with the diverter valve in one position permitting free flow of the water from the faucet into the sink, and in its other position causing the water to flow through the elbow 12 into the interior of the filter housing 8.

An open-ended tubular cover 9 is positioned around the lower end of the filter housing 8, and is clipped in place by clips such as the clip 13. The cover is easily removable by depressing the clips, so that the base may be removed for replacing the cartridge 7.

Unfiltered water from the faucet flows through the elbow 12 and through the inlet 52 in base 21 into the interior of the filter housing 8. The water is directed upwardly into the annular passage between the housing 8 and pre-filter screen 20, with the water passing through the pre-filter screen and then through the cartridge 7 in a radial direction into the central passage extending through the cartridge. The water is then forced upward through the longitudinal passage of fitting 18, and out through the spout 4, with filtered water being discharged through the outlet at the end of the spout.

The invention provides, therefore, an improved domestic filter unit for filtering tap water. The filter unit of the invention is efficient in its operation, compact and relatively simple in its construction, and may be easily opened to replace the filter unit.

A second embodiment of the subject invention is disclosed in FIGS. 4–8 and equivalent components are designated with identical numbers having a prime such as the first embodiment housing 8 and the second embodiment housing 8'. Except for the components needed to adapt the first embodiment into the second embodiment that utilizes a replaceable electronic display monitor, the components are essentially identical between the two embodiments.

Figure 4:
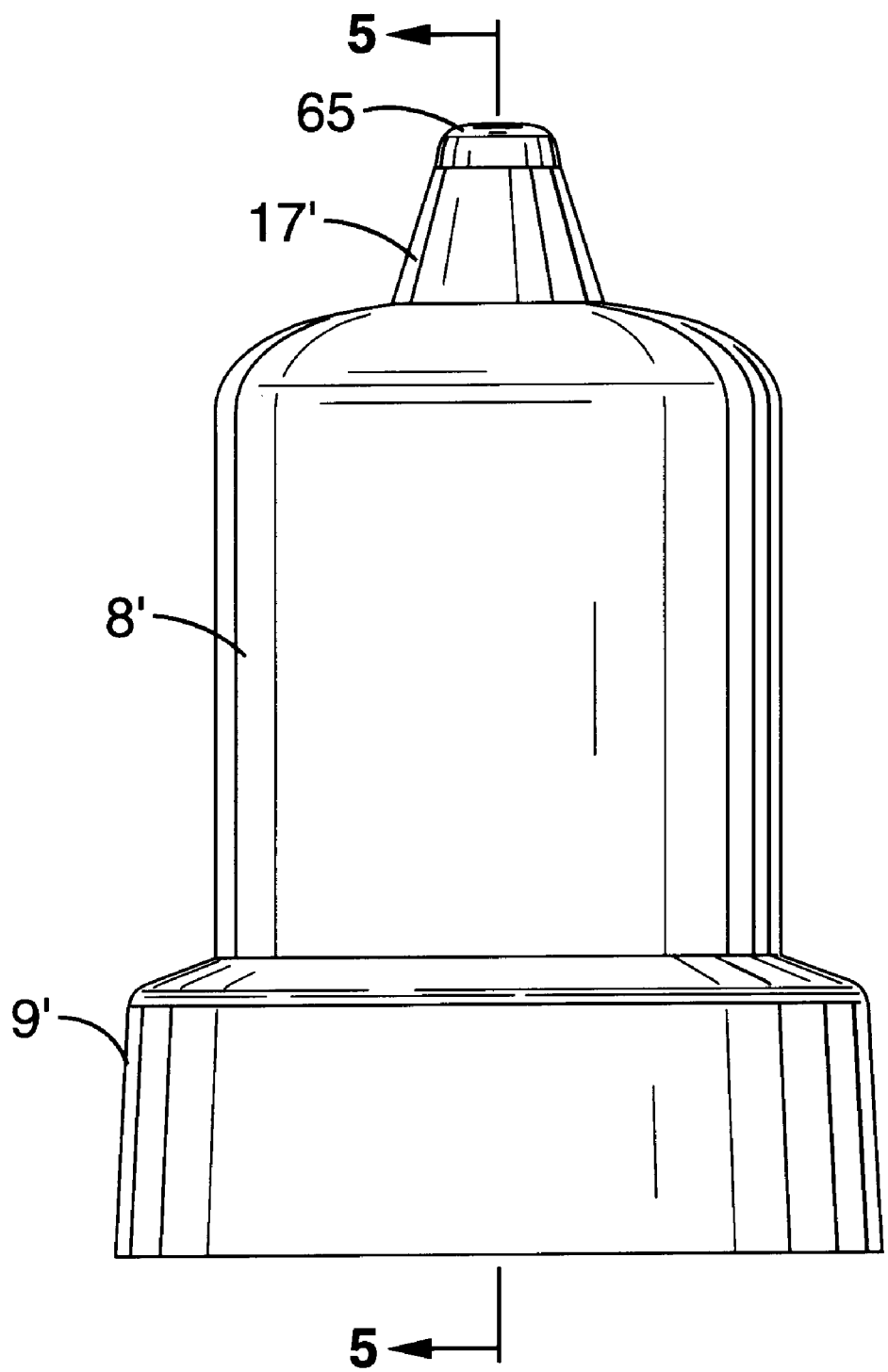
FIG. 4 is a side elevation view of a filter unit with the electronic display monitor which may be constructed to incorporate the concepts of the present invention.

As seen in FIG. 4, a removable or replaceable electronic display monitor 60 is mounted to the outlet housing 17'. The display monitor 60 functions to indicate the state of the life-span of the filter cartridge 7' within the unit. Rather than guessing whether or not the cartridge 7' is nearing the end of its useful life-span or keeping a record of how often the unit is used, the display monitor 60 and the associated components within the unit are included. The position of the display monitor 60 is such that a person using the subject device can easily see the display monitor 60. When the filter cartridge 7' is: within its useful life-span a green light is presented; nearing the end of its useful life-span a yellow light is presented; and when past its useful life-span a red light is presented. Clearly, other colors may be utilized as indicators, but the selected colors have well-known connotations that are useful in the subject application.

Figure 5A:
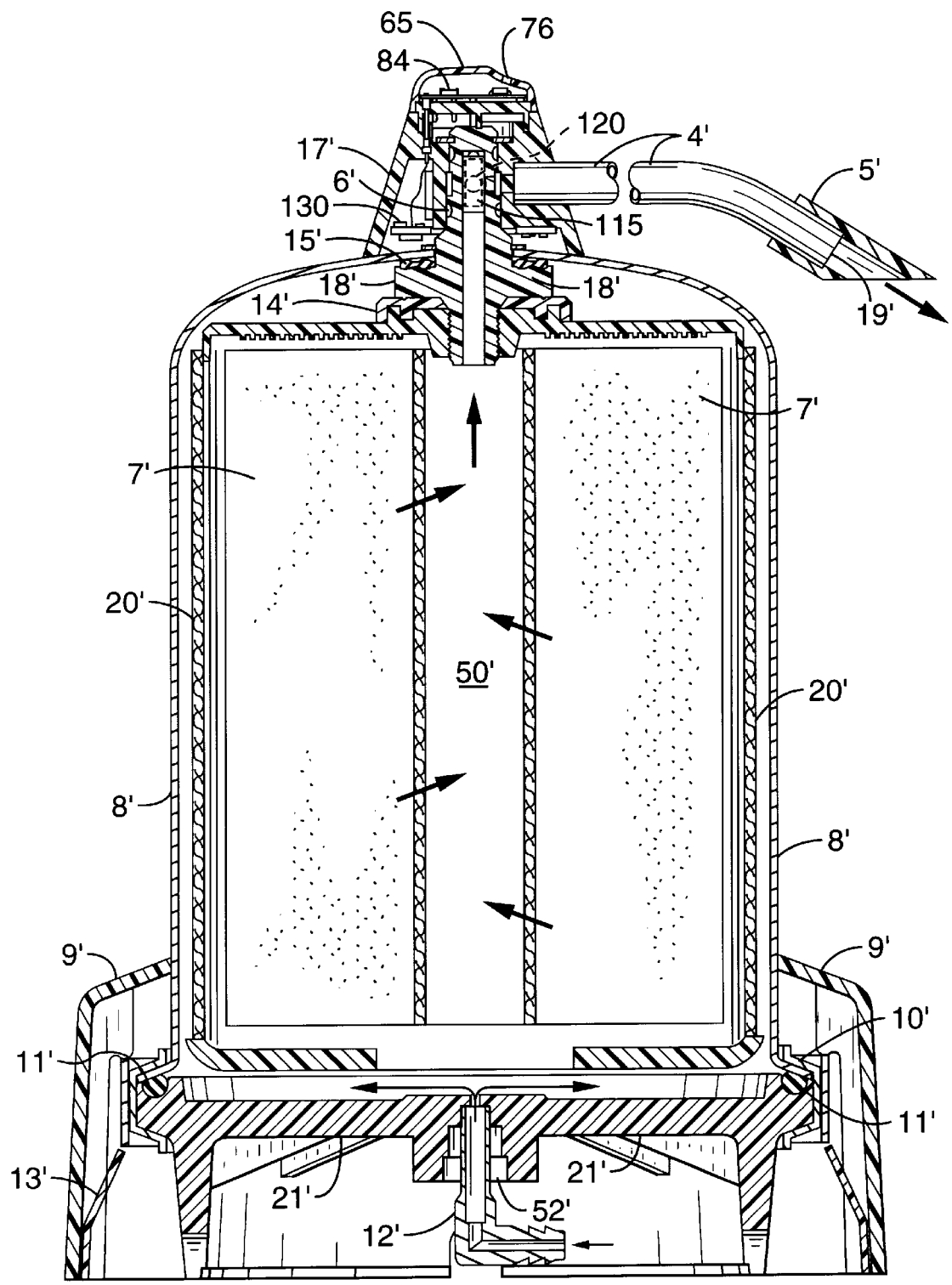
FIG. 5A is a is a is a side section of the unit of FIG. 4 taken essentially along lines 2—2 of FIG. 1 for the subject device with the electronic display monitor.
Figure 5B:
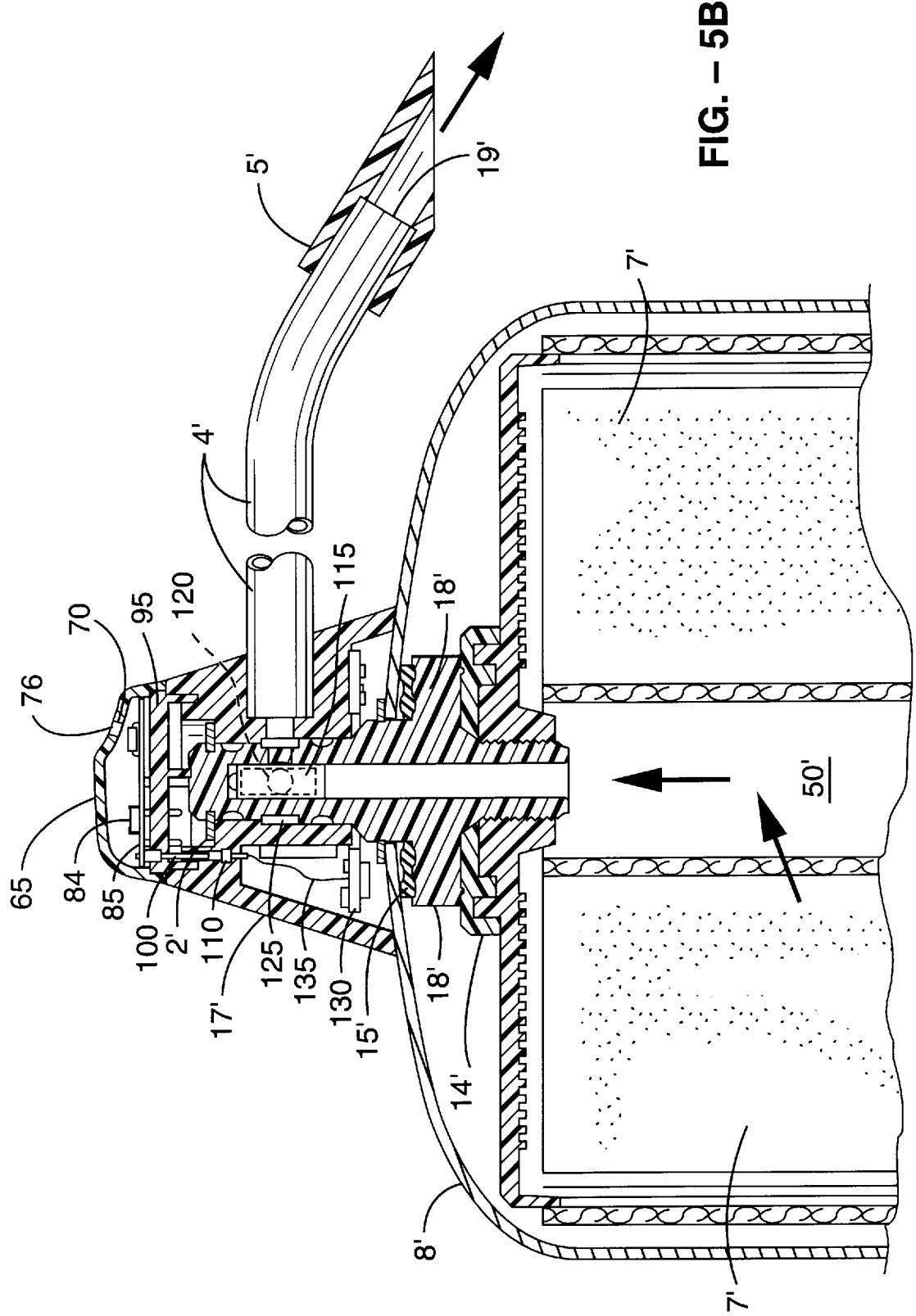
FIG. 5B is an enlargement of the upper region of FIG. 5A and shows the details of the interrelationship of the replaceable electronic display monitor with the remainder of the subject device.
Figure 6:
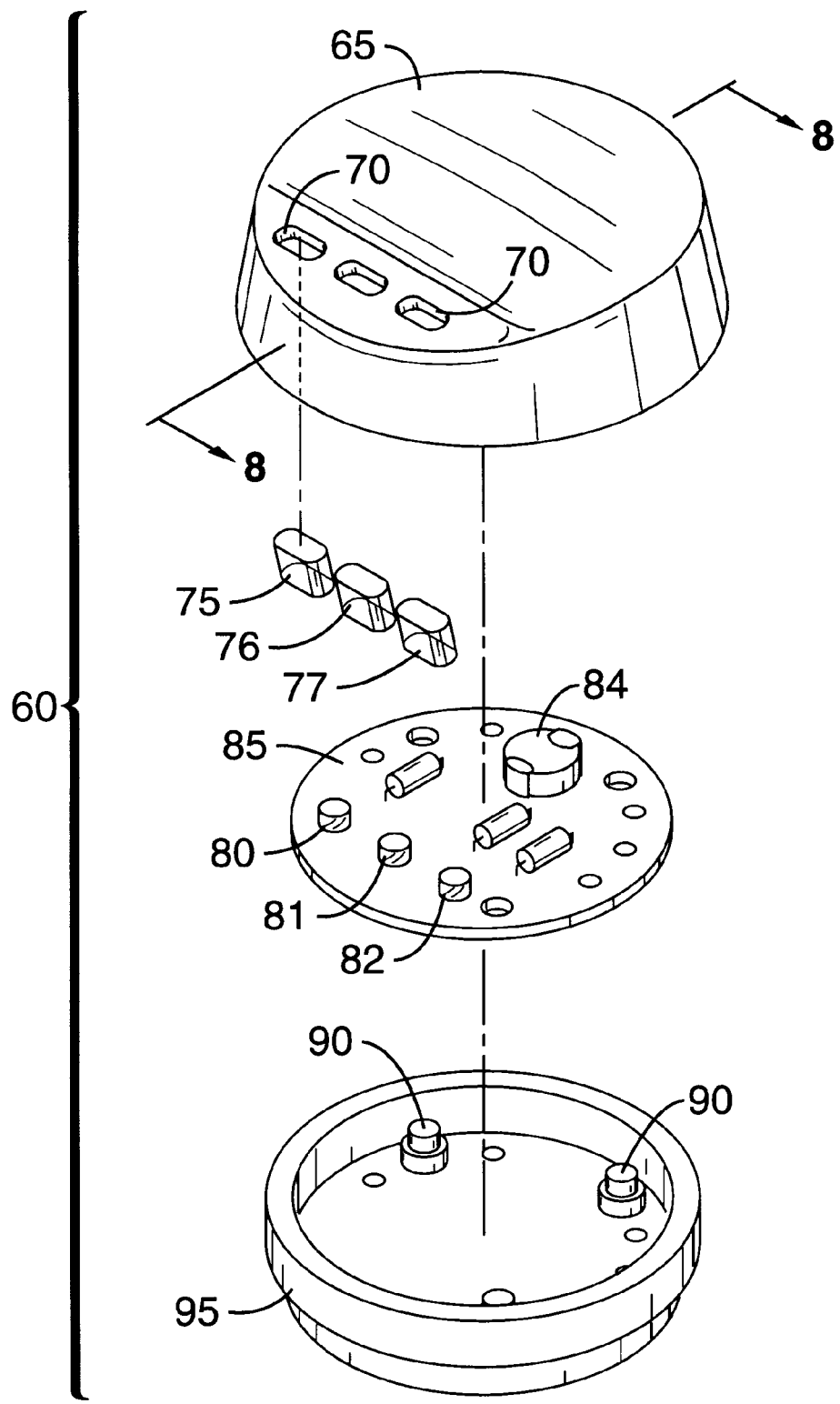
FIG. 6 is an exploded view of the electronic display monitor unit.
Figure 7:
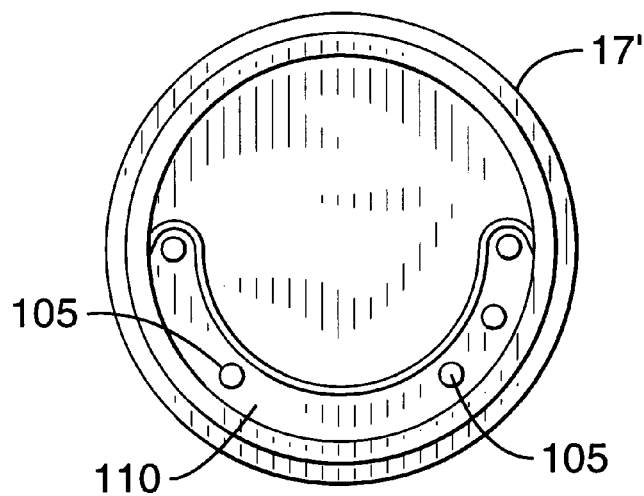
FIG. 7 is a top view of the socket on the subject housing into which fits the replaceable electronic display monitor unit.
Figure 8:
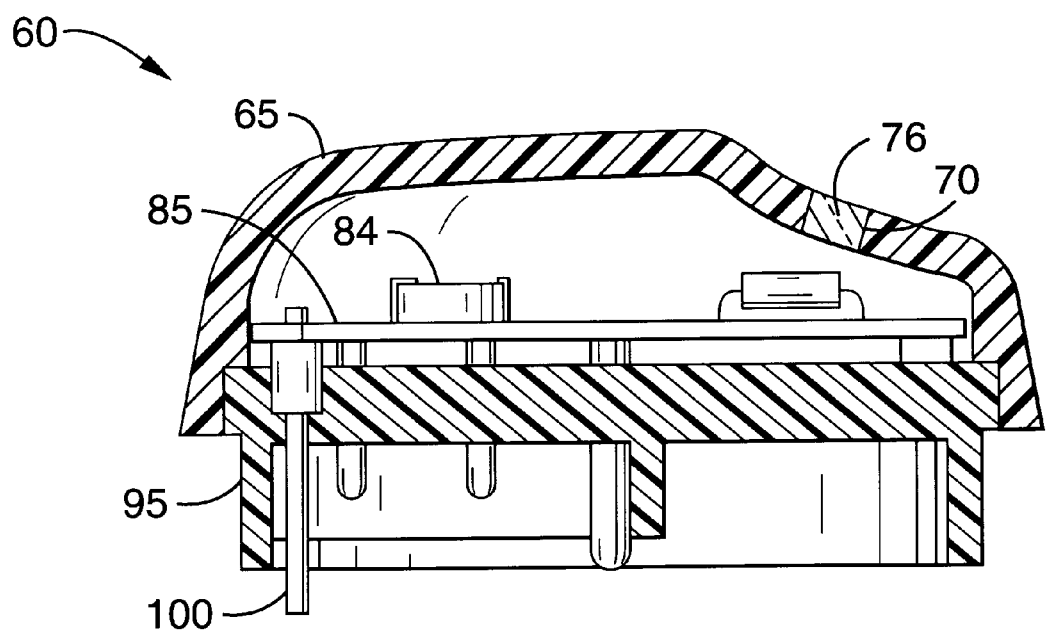
FIG. 8 is a side section of the replaceable electronic display monitor unit taken essentially along lines 8—8 of FIG. 6.

FIGS. 5A and 5B clearly depict the interrelationship of the replaceable electronic display monitor 60, including a power source, with the remainder of the subject invention. Comprising the display monitor 60 is the upper cover 65 that is fitted with lens apertures 70 for holding light transmitting lenses 75, 76, and 77. Each lens 75, 76, and 77 displays the light generated by a light source 80, 81, and 82, directly below it and mounted to a controlling circuit board 85 that includes a power source, preferably a standard battery 84. Usually, light source 80 is colored green, light source 81 is colored yellow, and light source 82 is colored red (the meanings of colors are indicated above). Commonly, the light sources 80, 81, and 82 are standard light bulbs, light emitting diodes, or the equivalent that usually operate in a non-continuous mode or blink to save energy and prolong the life of the power source. The required controlling circuit board 85 rests on supports 90 within a base member 95. FIG. 8 shows a sectional view of the assembled display monitor unit 60.

The display monitor unit 60 is replaceable since the battery 84 it contains has only a finite life-span and needs to be replaced when the energy is exhausted. Replacement of the entire unit 60 that contains the battery 84 every time the filter cartridge 7' is replaced is a practical solution that ensures that the display monitor unit 60 is displaying overall flow information only for the immediate filter cartridge 7' within the subject device.

The display monitor unit 60 has connections for electronically linking it with the associated water flow monitoring components within the outlet housing 17'. Shown in FIGS. 5B and 8 is a connection pin 100 of the type is required for mating with receiving channels 105 in the socket member 110. As long as suitable electronic communication is achieved between the display monitor unit 60 and the flow metering elements within the outlet housing 17', the exact configuration of the connection pins 100 and receiving channels 105 within socket member 110 is not critical for the subject invention and may vary within the equivalent designs of those skilled in the relevant arts.

The controlling electronics include standard means, usually a standard and suitably programmed microprocessor, for establishing the amount of water purified and interpreting that amount in term of the life-span of the filter cartridge 7'. The accepted life-span of the filter cartridge 7' is incorporated into the information held with the establishing and interpreting means. The establishing and interpreting means activates the appropriate indicator light source 80, 81, and 82 when it detects a given state of the filter cartridge 7', based on the total amount of water that has passed through the filter cartridge 7'.

Within the outlet housing 17', are the required elements for following the amount of liquid that the subject unit has passed or purified. Although other flow amount detection means are within the realm of this disclosure, a preferred flow amount detection means comprises a motion detectable ball 115 or similar object fitted within an upper flow channel 120 and the associated detection elements for following the movement of the ball 115 when water flows through the upper flow channel 120. As the filtered water flows past the ball 115, the amount of time the ball 115 is deflected is detected by the flow amount detection means. The flow amount detection means usually comprises a detector 125 that is sensitive to the motion of the ball 115 and associated operation and control means 130. One preferred operational mode for the detector 125 and associated control means 130 involves standard means for following fluctuations in a magnetic field as the ball 115 moves during the flow of filtered water. The standard means for operating and controlling the detector 130 (frequently a microprocessor or similar device and associated components) are included within the outlet housing 17' and electrically coupled, via suitable wiring 135 or the like, to the controlling electronics associated with the controlling circuit board 85 found within the replaceable display monitor unit 60. It must be remembered that the exact positioning of the electronic components or the nature and kind of components that are required to track the filtered water flow are variable for the subject invention, as long as the life-span of the filter cartridge 7' is satisfactorily monitored and presented to the operator or user by means of an easily seen visual display, preferably green, yellow, and red lights.

A user of the subject device follows the life-span of the filter cartridge by noting the emitted color on the display monitor. Upon seeing a yellow or red light, the user would open the filter housing and replace the expended filter cartridge with a new filter cartridge and replace the display monitor unit with a new one containing a fresh battery and information that a new filter cartridge has been installed.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed:

1. A counter top water filter unit used by an operator, comprising:
   a) a filter unit having filter housing containing a removable cylindrical filter cartridge and a removable pre-filter screen coaxial with said cartridge and surrounding said cartridge;
   b) an outlet housing mounted to said filter housing;
   c) replaceable means associated with said outlet housing for evaluating the life-span of said filter cartridge, wherein when said life-span for said filter cartridge has expired said replaceable life-span evaluation means is replaced; and
   d) means associated with said replaceable life-span evaluation means for powering said replaceable evaluation means.

2. A counter top water filter unit according to claim 1, wherein said replaceable life-span evaluation means comprises:
   a) a removable electronic display monitor unit with a first indicator designating said filter cartridge is within said predetermined life-span, a second indicator designating said filter cartridge is about to pass beyond said predetermined life-span, and a third indicator designating said filter cartridge is past said predetermined life-span;
   b) means for determining an amount of filtered water passing through said outlet housing, wherein said amount determining means electrically couples with said removable electronic display monitor unit; and
   c) a battery within said removable electronic display monitor.

3. A counter top water filter unit according to claim 2, wherein said removable electronic display monitor unit has a green light designating said filter cartridge is within said predetermined life-span, a yellow light designating said filter cartridge is about to pass beyond said predetermined life-span, and a red light designating said filter cartridge is past said predetermined life-span.

4. A counter top water filter unit according to claim 1, wherein said replaceable life-span evaluation means comprises:
   a) a removable electronic display monitor unit mounted to said outlet housing;
   b) a visual display in said removable electronic display monitor unit having three lights, a green light designating said filter cartridge is within said predetermined life-span, a yellow light designating said filter cartridge is about to pass beyond said predetermined life-span, and a red light designating said filter cartridge is past said predetermined life-span; and
   c) means for evaluating the amount of filtered water that has passed through said filter cartridge and activating said visual display to illuminate an appropriate said green, yellow, or red light.

5. A counter top water filter unit used by an operator, comprising:
   a) a filter unit having a removable cylindrical filter cartridge and a removable pre-filter screen coaxial with said cartridge and surrounding said cartridge;
   b) replaceable means for evaluating if said filter cartridge is within a predetermined life-span, wherein said life-span evaluation means comprises a removable visual display with a first indicator designating said filter cartridge is within said predetermined life-span, a second indicator designating said filter cartridge is about to pass beyond said predetermined life-span, and a third indicator designating said filter cartridge is past said predetermined life-span, wherein when said life-span for said filter cartridge has expired said replaceable evaluation means is replaced; and
   c) means associated with said replaceable life-span evaluation means for powering said replaceable evaluation means.

6. A counter top water filter unit according to claim 5, wherein said replaceable life-span evaluation means comprises said removable visual display with a green light designating said filter cartridge is within said predetermined life-span, a yellow light designating said filter cartridge is about to pass beyond said predetermined life-span, and a red light designating said filter cartridge is past said predetermined life-span and a battery within said removable visual display.

7. A counter top water filter unit used by an operator, comprising:
   a) a filter housing having a closed top and an open bottom;
   b) a base removably mounted on said filter housing open bottom and closing said filter housing open bottom;
   c) an inlet extending through said base into an interior of said filter housing;
   d) a filter cartridge removably mounted in said filter housing and having an upper end and a lower end with a central passage extending between said upper and lower ends;
   e) a pre-filter screen extending around said filter cartridge in coaxial relationship therewith between the periphery of said filter cartridge and an inner bore surface of said filter housing to form an annular passage extending around a periphery of said pre-filter screen;
   f) upper end cap being spaced between said filter housing closed top and said filter cartridge upper end;
   g) lower end cap being spaced between said base and said filter cartridge lower end;
   h) an elongated outlet fitting mounted on said upper end cap in a space between said upper end cap and said filter housing closed top coaxial with said filter cartridge and extending longitudinally into said filter cartridge central passage and protruding longitudinally through said filter housing closed top;
   i) an outlet housing in coaxial relationship with said elongated outlet fitting and rotatable about a longitudinal axis of said elongated outlet fitting;
   j) a radial spout fitted into said rotatable outlet housing and communicating with said central passage of said filter cartridge through passages extending through said elongated outlet fitting;
   k) replaceable means for evaluating if said filter cartridge is within a predetermined life-span, wherein when said life-span for said filter cartridge has expired said replaceable life-span evaluation means is replaced; and
   l) means associated with said replaceable life-span evaluation means for powering said replaceable evaluation means.

8. A counter top water filter unit according to claim 7, wherein said replaceable life-span evaluation means comprises a visual display with a first indicator designating said filter cartridge is within said predetermined life-span, a second indicator designating said filter cartridge is about to pass beyond said predetermined life-span, and a third indicator designating said filter cartridge is past said predetermined life-span and a battery as said means for powering said replaceable life-span evaluation means.

9. A counter top water filter unit according to claim 7, wherein said replaceable life-span evaluation means comprises a visual display with a green light designating said filter cartridge is within said predetermined life-span, a yellow light designating said filter cartridge is about to pass beyond said predetermined life-span, and a red light designating said filter cartridge is past said predetermined life-span and a battery as said means for powering said replaceable life-span evaluation means.

10. A counter top water filter unit according to claim 7, wherein said replaceable life-span evaluation means comprises:
   a) a removable electronic display monitor unit with a first indicator designating said filter cartridge is within said predetermined life-span, a second indicator designating said filter cartridge is about to pass beyond said predetermined life-span, and a third indicator designating said filter cartridge is past said predetermined life-span;
   b) means for determining an amount of filtered water passing through said outlet housing, wherein said amount determining means electrically couples with said removable electronic display monitor unit; and
   c) a battery as said means for powering said replaceable life-span evaluation means.

11. A counter top water filter unit according to claim 10, wherein said electronic display monitor unit has a green light designating said filter cartridge is within said predetermined life-span, a yellow light designating said filter cartridge is about to pass beyond said predetermined life-span, and a red light designating said filter cartridge is past said predetermined life-span.

12. A counter top water filter unit according to claim 7, wherein said replaceable life-span evaluation means comprises:
   a) an electronic display monitor unit mounted to said outlet housing;
   b) a visual display in said electronic display monitor unit having three lights, a green light designating said filter cartridge is within said predetermined life-span, a yellow light designating said filter cartridge is about to pass beyond said predetermined life-span, and a red light designating said filter cartridge is past said predetermined life-span;
   c) means for evaluating the amount of filtered water that has passed through said filter cartridge and activating said visual display to illuminate an appropriate said green, yellow, or red light; and
   d) a battery as said means for powering said replaceable life-span evaluation means.

* * * * *